United States Patent [19]
Nakazono

[11] Patent Number: 5,472,474
[45] Date of Patent: Dec. 5, 1995

[54] METHOD FOR PRODUCING LIQUID FERTILIZER

[76] Inventor: Shuzo Nakazono, 7-17, Hirao 4-chome, Chuo-ku, Fukuoka-shi, Fukuoka, Japan

[21] Appl. No.: 276,272

[22] Filed: Jul. 18, 1994

[30] Foreign Application Priority Data

May 31, 1994 [JP] Japan ................................ 6-118769
May 16, 1994 [JP] Japan ................................ 6-101379

[51] Int. Cl.⁶ .................... C05F 3/00; C05F 3/04; C05F 1/00
[52] U.S. Cl. .................... 71/12; 71/15; 71/16; 71/21; 71/64.1
[58] Field of Search ................ 71/12, 13, 15, 71/16, 21, 64.1

[56] References Cited

FOREIGN PATENT DOCUMENTS 1227980  10/1986  Japan .................................. 71/64.1

Primary Examiner—Ferris Lander
Attorney, Agent, or Firm—Jordan and Hamburg

[57] ABSTRACT

A method for producing liquid fertilizer is characterized in that raw material made of human waste consisting of feces and urine is made to come into contact with heated animal oil, plant oil, mineral oil or a mixture of these oils under a reduced pressure, and water contained in the raw material is evaporated from the raw material and moisture made of evaporated water is collected, cooled and liquefied to produce liquid fertilizer.

4 Claims, 1 Drawing Sheet

METHOD FOR PRODUCING LIQUID FERTILIZER

BACKGROUND OF INVENTION

This invention relates to a method for producing liquid fertilizer.

Conventionally, the treatment of human feces and urine or other wastes in a sludge form has necessitated a huge amount of expense.

The water content of raw material made of human waste consisting of feces and urine is approximately 97 percent. Thus, the moisture or vapor produced by burning the raw material includes malodors. Accordingly, the moisture is drained by way of an expensive deodorizing treatment and thereafter is discharged into the river or sea.

Sewage sludge, garbage discharged from a kitchen, garbage from a food plant, or waste made of internal organs, bones, and blood from animals or fish also requires a considerable expense for the treatment thereof, since the treatment varies according to the kind of raw material and each treatment is cumbersome and time-consuming.

Eventually, the treatment of the raw material produces primarily a powdery solid fertilizer or forage so that production of a liquid fertilizer further necessitates a separate or additional liquefying treatment.

Also, since the treatment of the raw material made of human waste requires a considerable expense, the scattering of the raw material in the ocean is still continuing.

Accordingly, there is a need for a method which can effectively treat the raw material made of human waste.

It is an object of this invention to provide a method for producing liquid fertilizer characterized in that raw material made of human waste consisting of feces and urine is made to come into contact with heated animal oil, plant oil, mineral oil or a mixture of these oils under a reduced pressure, and water contained in the raw material is evaporated from the raw material and moisture made of evaporated water is collected, cooled and liquefied to produce liquid fertilizer.

It is another object of the present invention to provide a method for producing liquid fertilizer characterized in that sewage sludge, garbage discharged from a kitchen, garbage from a food plant, or waste made of internal organs, bones, and blood from animals and fish is made to come into contact with heated animal oil, plant oil, mineral oil or a mixture of these oils under a reduced pressure, and water contained in the raw material is evaporated from the raw material and moisture made of evaporated water is collected, cooled and liquefied to produce liquid fertilizer.

In this invention, approximately 1000 kg of raw material made of human waste consisting of feces and urine is charged into a cooker having a capacity of 7 m$^3$ which preliminarily stores approximately 800 kg of animal oil, plant oil or mineral oil heated at a temperature of 70° C.–150° C.

Simultaneously, or after a lapse of a predetermined time (approximately 1 hour and a half to 3 hours), the pressure of the inside of the cooker is reduced (from the normal pressure to approximately 500 to 700 mmHg).

As a result of heating and reduction in pressure, the water components contained in the raw material made of human waste evaporate and the vapor and fills the cooker.

The vapor is continuously extracted or taken out of the cooker and is cooled by a condenser and drained to produce liquid.

This liquid is directly used as liquid fertilizer or water soluble nitrogen is added to the liquid to produce liquid fertilizer for hydroponics. The raw material made of human waste is dehydrated making use of the oil in the cooker and the dehydrated human waste is taken out of the cooker and the oil component is removed therefrom so as to produce fertilizer or forage in a cake form containing a high percentage of protein.

Sewage sludge, garbage discharged from a kitchen, garbage from a food plant, or waste made of internal organs, blood or bones of animals also can be heated and dehydrated in the cooker in the same manner under a reduced pressure and the vapor is cooled and drained to produce liquid fertilizer. Additionally, the raw material is dehydrated to produce fertilizer or forage in a powder or cake form containing high percentage of protein.

DETAILED DESCRIPTION OF THE DISCLOSURE

Figure 1:
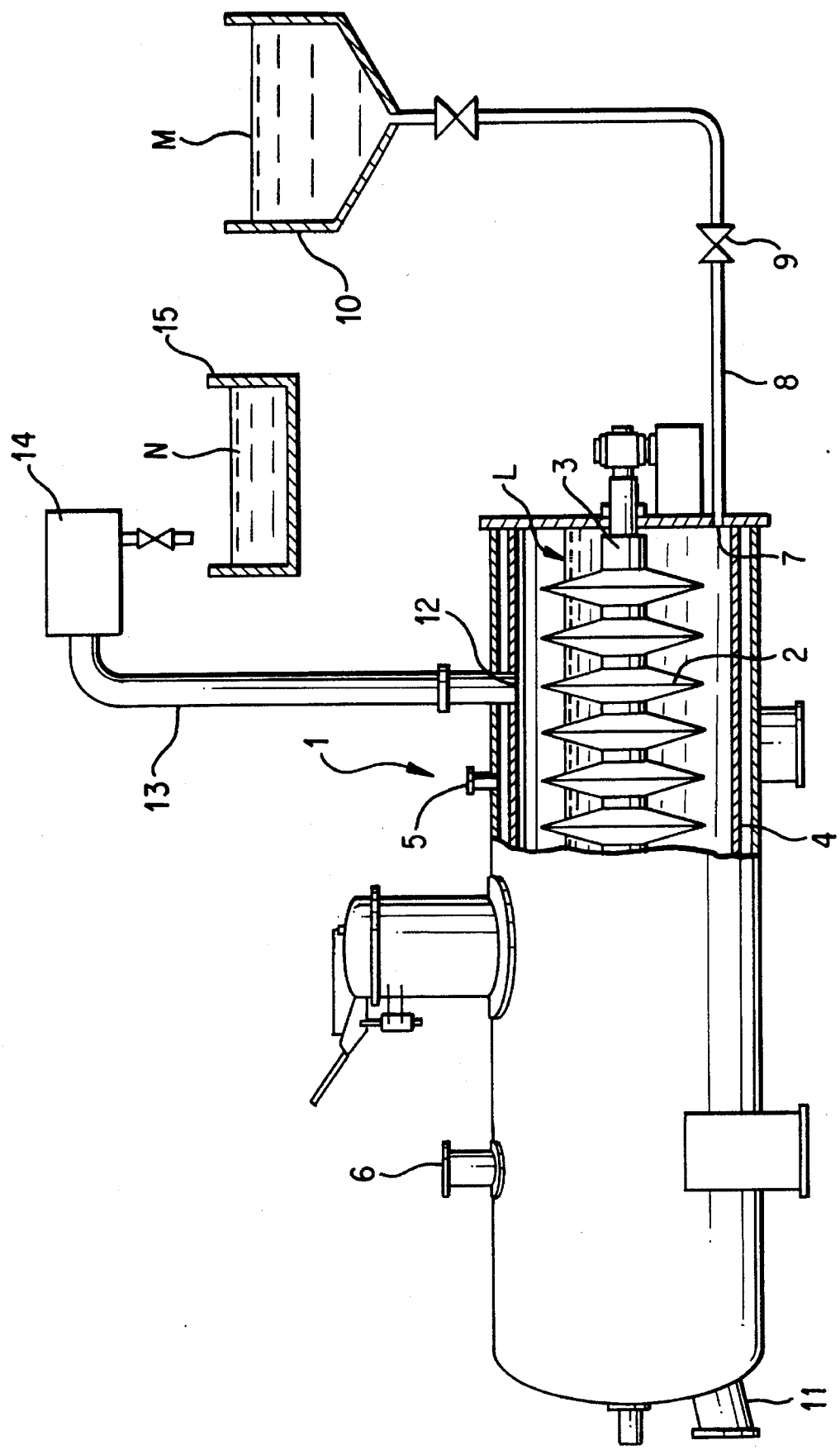
FIG. 1 is a partially broken side view of a device used for the method of this invention for producing the liquid fertilizer.

The invention is explained in view of attached drawing.

FIG. 1 is an illustration of an apparatus suitable for carrying out the method of producing liquid fertilizer of this invention. Numeral 1 indicates a cooker. Agitating blades 2 are rotatably disposed in the cooker 1 having a rotary shaft 3 for supporting agitating blades 2.

In the peripheral wall of the cooker 1, a jacket portion 4 is formed and pressurized steam fills the jacket portion 4, the rotary shaft 3 and the agitating blades 2.

Numeral 5 indicates a pressurized steam inlet provided for charging pressurized steam into the jacket portion 4.

The cooker 1 is filled with animal oil, plant oil, mineral oil or a mixture of these oils L, while the various oils in the cooker 1 are heated by means of steam charged in the jacket portion 4, the rotary shaft 3 and the agitating blades 2 under pressure.

Numeral 6 indicates an air bleed port provided at the peripheral wall of the cooker 1, wherein the air in the cooker 1 is discharged through the air bleed port 6 so as to reduce the pressure in the cooker 1.

Numeral 7 indicates a raw material feeding port which is disposed at a position below the surface of the oil stored in the cooker 1. The raw material feeding port 7 communicates with a raw material feeding pipe 8, which, in turn, is provided with a valve 9 in the midst thereof for permitting or preventing the supply of raw material.

The raw material feeding pipe 8 has at the proximal end thereof a raw material hopper 10. The raw material made of human waste consisting of feces and urines, or sewage sludge, garbage discharged from a kitchen, garbage from a food plant, or waste made of internal organs, blood or bones of animals is poured into the raw material hopper 10 and fed to the cooker 1.

Numeral 11 indicates a discharge outlet provided for discharging the processed raw material.

Apart from the air bleed port 6, the cooker 1 is provided with a vapor outlet 12 on the peripheral wall thereof, which communicates with a vapor take-out pipe 13. The proximal end of the vapor take-out pipe 13 communicates with a condenser 14 so that the vapor extracted or taken out is cooled and drained to produce liquid which is stored in a liquid fertilizer tank 15.

The method of this invention is carried out in the following manner with the above-mentioned device, wherein human waste consisting of feces or urines is used as raw material.

The raw material is introduced into the cooker 1, which, is preliminarily filled with animal oil, plant oil, mineral oil or a mixture of these oils L and heated steam is introduced under pressure into the jacket portion 4 formed in the peripheral wall of the cooker 1.

The raw material M in the cooker 1 is heated by the oil temperature in the cooker 1.

After charging the raw material M in the cooker 1, the pressure of the inside of the cooker 1 is reduced.

The pressure reducing conditions are in three forms, wherein the first pressure reducing condition is that a pressure of 500 mmHg–700 mmHg in the cooker 1 is reduced from a normal pressure while the heating condition is set at a temperature which falls within a range of 70° C.–150° C. which is suitably determined corresponding to the kind of bacteria being contained in the liquid fertilizer.

The second pressure reducing condition is that the pressure is reduced in two stages after the charging of the raw material, wherein the initial stage, a pressure of 20–100 mmHg is reduced from the normal pressure for 30 minutes, and in the subsequent stage, a pressure of 700–750 mmHg is reduced for 1–2 hours from the pressure reduced in the initial stage.

The third pressure reducing condition is that the pressure is reduced in three stages from the normal pressure after the charging of the raw material, wherein in the initial stage, a pressure of approximately 200 mmHg is reduced from the normal pressure for 5 to 10 minutes, and in the intermediate stage, a pressure of 300 mmHg–400 mmHg is reduced from the pressure reduced in the initial stage approximately for 20 minutes, and in the final stage, a pressure of 250 mmHg–500 mmHg is reduced approximately for 1 hour to 1.5 hours. Consequently, the inside of the cooker 1 is substantially evacuated.

In this manner, upon heating the raw material H made of human waste with the heated oil in the cooker 1 under a predetermined reduced pressure condition, the water component contained in the raw material is dehydrated and a considerable amount of water is vaporized from the raw material having a high water content.

Furthermore, water contained at the core of the raw material is replaced with oil due to the difference of specific gravities between water and oil under time reduced pressure so that the heated oil is infiltrated into time core while the water contained in the core is vaporized.

In this manner, the water component vaporized from time raw material in the cooker 1 is taken out from the vapor outlet 12 and is fed to the condenser 14.

In the condenser 14, the vapor taken out from the cooker 1 is cooled and drained to produce liquid N which is to be collected.

The collected liquid N contains various bacteria which are contained in the human waste consisting of feces and urines as organic fertilizer components and the liquid N also contains nitrogen, phosphate and potassium.

The liquid N can be directly used as liquid fertilizer in water cultivation, while the solid components remaining in the oil in the cooker 1 are dehydrated as dehydrated residue or squeezed to produce powdery fertilizer or forage having a high protein content.

The drained liquid is directly used as liquid fertilizer or water soluble nitrogen is added to it to produce liquid fertilizer.

The temperature of the oil is determined in view of the pressure reducing conditions, wherein in the previously mentioned first reduced pressure condition, the heating is carried out with the oil temperature of 70° C. to 150° C.

In the second reduced pressure condition, the oil temperature is set at 40° C. to 50° C. at the initial reducing pressure and the oil temperature is set at 50° C. to 70° C. at the subsequent reduced pressure.

In the third reduced pressure condition, the oil temperature is set at 60° C. to 70° C. at the initial reducing pressure and the oil temperature is set at 50° C. to 60° C. at the intermediate reducing pressure and the oil temperature is set at 60°.C. to 65° C. at the final reduced pressure.

In other embodiments, sewage sludge, garbage discharged from a kitchen, garbage from a food plant or waste made of internal organs, bones, or blood from animals and fish can be used.

These raw materials are charged in the animal oil, the plant oil, the mineral oil, or mixtures thereof and heated in the cooker in the same manner as that of the raw material made of human waste and dehydrated and heated by the temperature of the oil under a reduced pressure.

Then, the vapor generated at the time of dehydration of the raw material is fed to the condenser and is cooled and drained to produce the liquid fertilizer.

The pressure reducing conditions and heating temperature are the same as those of the previous embodiment.

According to this invention, since the raw material having a high water content is treated with the temperature of heated oil and vapor is extracted therefrom and drained to be used as liquid fertilizer, the drain is free of malodor, while the collected vapor from the raw material contains nitrogen, phosphate and potassium, components of organic fertilizer such as various bacteria which are contained in the human waste consisting of feces and urine and the water soluble protein. Accordingly, such vapor can be used as organic fertilizer having high quality.

Especially, since the raw material made of human waste consisting of feces and urine contains a high percentage of water, a considerable amount of drain can be collected, while the processing of the raw material made of human waste per se can be simultaneously carried out. Namely, the production of the liquid fertilizer as organic fertilizer and the treatment of the raw material made of human waste are simultaneously carried out.

I claim:

1. A method for producing liquid fertilizer comprising adding raw material made of human waste consisting of feces and urine to heated animal oil, plant oil, mineral oil or a mixture of these oils under a reduced pressure, said raw material having a high water content, dehydrating said raw material using said heated oil, evaporating water from said raw material and obtaining solid components of said raw material in said heated oil, said evaporated water containing organic fertilizer components, nitrogen, phosphate and potassium, collecting a vapor made of said evaporated water, cooling and liquifying said vapor to produce liquid fertilizer and squeezing said solid components from said heated oil to produce a powdery fertilizer or forage having a high protein content.

2. The method of claim 1, wherein in said step of dehydrating, said heated oil replaces water contained in said raw material.

3. A method for producing liquid fertilizer comprising adding raw material made of sewage sludge, garbage discharged from a kitchen, garbage from a food plant, or waste made of internal organs, bones, or blood from animals or fish to heated animal oil, plant oil, mineral oil or a mixture of these oils under a reduced pressure, said raw material or waste having a high water content, dehydrating said raw material or waste using said heated oil, evaporating water contained in said raw material or waste and obtaining solid components of said raw material or waste in said heated oil, said evaporated water containing organic fertilizer components, nitrogen, phosphate and potassium, collecting a vapor made of said evaporated water, cooling and liquefying said vapor to produce liquid fertilizer and squeezing said solid components from said heated oil to produce a powdery fertilizer or forage having a high protein content.

4. The method of claim 3, wherein in said step of dehydrating, said heated oil replaces water contained in said raw material or waste.

\* \* \* \* \*